Figure 1:
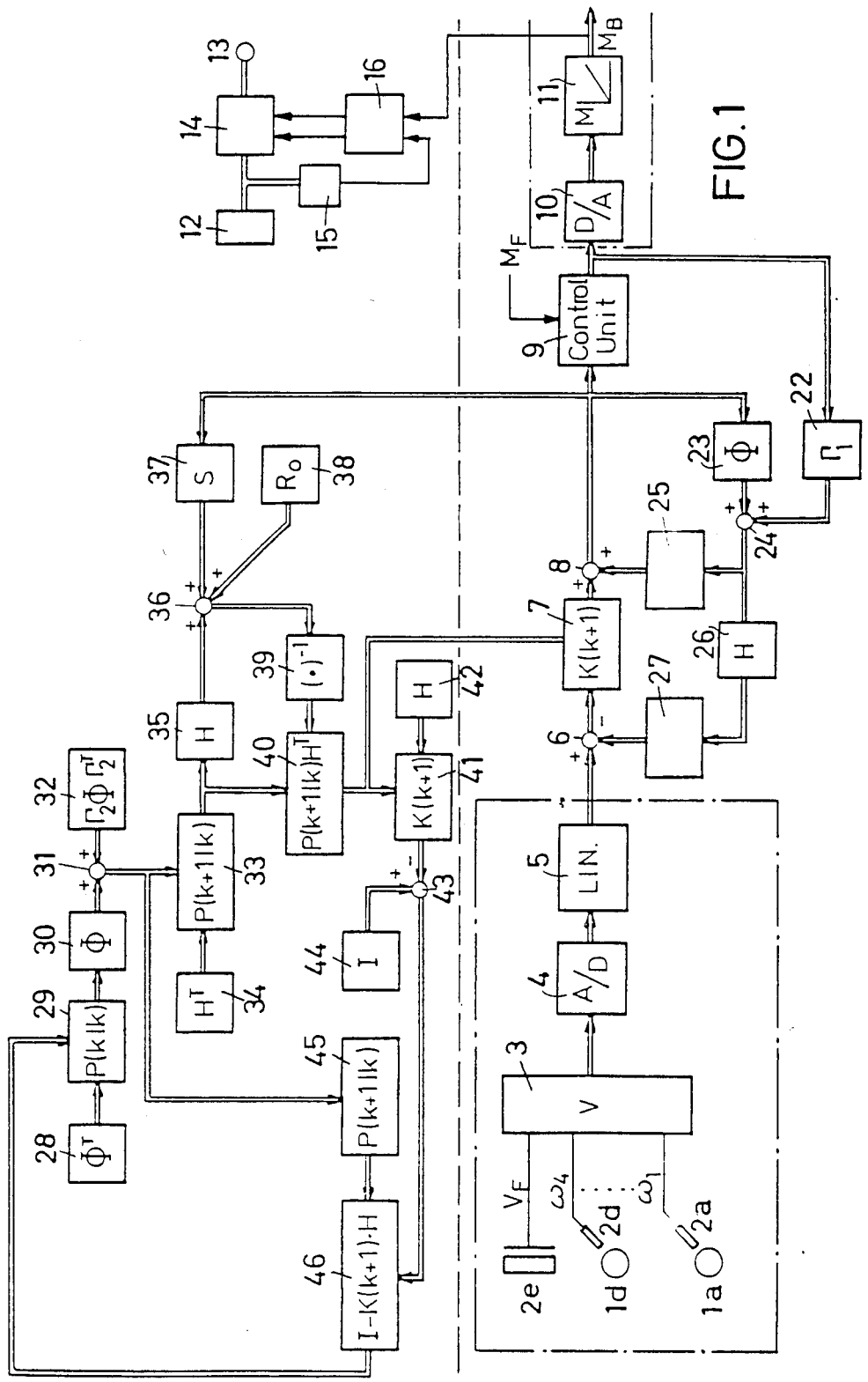

United States Patent [19]

van Zanten et al.

[11] Patent Number: 4,679,866
[45] Date of Patent: Jul. 14, 1987

[54] METHOD FOR ASCERTAINING THE SET-POINT BRAKING MOMENT FOR THE VARIOUS WHEELS OF A VEHICLE

[75] Inventors: Anton van Zanten, Ditzingen; Gerhard Heess, Tamm, both of Fed. Rep. of Germany; Hans P. Geering, Winterthur, Switzerland

[73] Assignee: Robert Bosch GmbH, Stuttgart, Fed. Rep. of Germany

[21] Appl. No.: 768,096

[22] PCT Filed: Dec. 15, 1984

[86] PCT No.: PCT/EP84/00403
§ 371 Date: Aug. 16, 1985
§ 102(e) Date: Aug. 16, 1985

[87] PCT Pub. No.: WO85/02590
PCT Pub. Date: Jun. 20, 1985

[30] Foreign Application Priority Data

Dec. 16, 1983 [DE] Fed. Rep. of Germany ....... 3345545

[51] Int. Cl.$^4$ ............................................. B60T 8/60
[52] U.S. Cl. .................................. 303/104; 303/109; 364/724
[58] Field of Search ................... 303/93, 91, 100, 104, 303/95, 94, 103, 109; 364/426, 728, 724

[56] References Cited

U.S. PATENT DOCUMENTS

| | | | |
|---|---|---|---|
| 3,520,575 | 7/1970 | Steigerwald | 303/93 |
| 3,614,173 | 10/1971 | Branson | 303/93 |
| 3,702,714 | 11/1972 | Branson | 303/104 |
| 4,080,007 | 3/1978 | Acker et al. | 303/104 |
| 4,320,287 | 3/1982 | Rawicz | 364/724 |
| 4,472,812 | 9/1984 | Sakaki et al. | 364/724 |

FOREIGN PATENT DOCUMENTS 1018548 1/1966 United Kingdom .
2004011 3/1979 United Kingdom .

OTHER PUBLICATIONS

IEEE Transactions on Communication Technology, vol. COM-19, No. 6, Dec. 1971, New York (US), R. E. Lawrence et al., "The Kalman Filter for the Equalization of a Digital Communications Channel"; pp. 1137-1141.

Primary Examiner—John W. Caldwell, Sr.
Assistant Examiner—Alvin Oberley
Attorney, Agent, or Firm—Edwin E. Greigg

[57] ABSTRACT

A method is described for ascertaining the set-point braking moment for the various wheels of a vehicle, in which to this end, signals dependent on the wheel speeds $V_{Ri}$ and the vehicle speed $V_F$ are used. The signals from which the set-point braking moments are ascertained are obtained by sending the signals corresponding to the wheel speeds and the vehicle speed through an especially embodied Kalman filter.

10 Claims, 4 Drawing Figures

METHOD FOR ASCERTAINING THE SET-POINT BRAKING MOMENT FOR THE VARIOUS WHEELS OF A VEHICLE

The invention relates to a method for ascertaining the set-point braking moment for various wheels of a vehicle.

It is known that a motor vehicle tire attains the maximum braking force while locking only in the rarest cases. As a rule, the maximum braking force is transmitted if the rotational speed of the wheel is slightly below that of an unbraked wheel. Anti-locking or anti-skid braking systems (ABS) are designed such that the rotational speed of the wheel is kept in the vicinity of this optimum.

In order to keep the wheel speed in the vicinity of the optimum, the wheel speed is continuously measured and the wheel acceleration is calculated. From these two status parameters, an algorithm for determining the optimum is derived. The two status parameters, wheel speed and wheel acceleration, describe the wheel behavior. In ABS braking, the wheel behavior thus determines the course of regulation.

For good ABS function, the wheel behavior should be known as accurately as at all possible. If the wheel speed could be measured without error, then it would be possible to determine the wheel behavior exactly. However, such measuring methods are at the least very expensive. Distortion in force transmission between the tire and the road or in the brake system can interfere with regulation. Such distortion can be attenuated by using threshold values, based on a study of the physics of the situation.

When a Kalman filter is used in accordance with the invention, the deviations in the measured and regulated variables are estimated. Also, with a mathematical description of the regulated path (for instance of the wheel), the status is pre-calculated and the result is compared with the (noisy) measurement signal. Since the mathematical description of the regulated path includes the laws of physics, further studies of the physics of the situation are no longer needed.

It is presumed here that the signals for the wheel speeds and the vehicle speed are in fact available. It does not matter how they are obtained or whether they have already undergone filtering.

In the present invention, the Kalman filter is used not only to filter out measurement errors but also to estimate unknown variables such as the individual braking forces. The tire slip is derived from the vehicle speed and the wheel speed. This slip is compared with a predetermined slip, and the difference is furnished to the brake pressure regulator. The brake pressure regulator is designed such that the tire slip is as close as possible the set-point tire slip value.

The set-point slip can be either fixed or variable and can then be calculated using the vehicle speed and the characteristics of the road. The object of fixing the set-point slip could be to shift the mean tire slip value to where the braking force is maximal. Since the maximum of the slip curve varies with the vehicle speed, adapting the set-point slip to the vehicle speed results in shorter braking distances. The situation with road characteristics is similar. It is known, however, that lateral guidance force decreases as the tire slip increases. To improve lateral guidance of the vehicle, the set-point slip should be selected to be a smaller value than that at which the braking force is maximal. If the road is unsymmetrical, the influence of this reduction of the set-point slip is twofold. First, the yawing moment can be reduced thereby, and second, the guide forces are increased.

The braking moment is regulated according to the invention by regulating slip. Various regulators will be proposed hereinafter for controlling the braking moment. One of the regulators, a multi-step regulator, also takes the dynamic principles of the wheel into account. The multi-step regulator controls the braking moment in such a way that the tire slip approximately reaches the set-point slip value in one or more steps.

Figure 2:
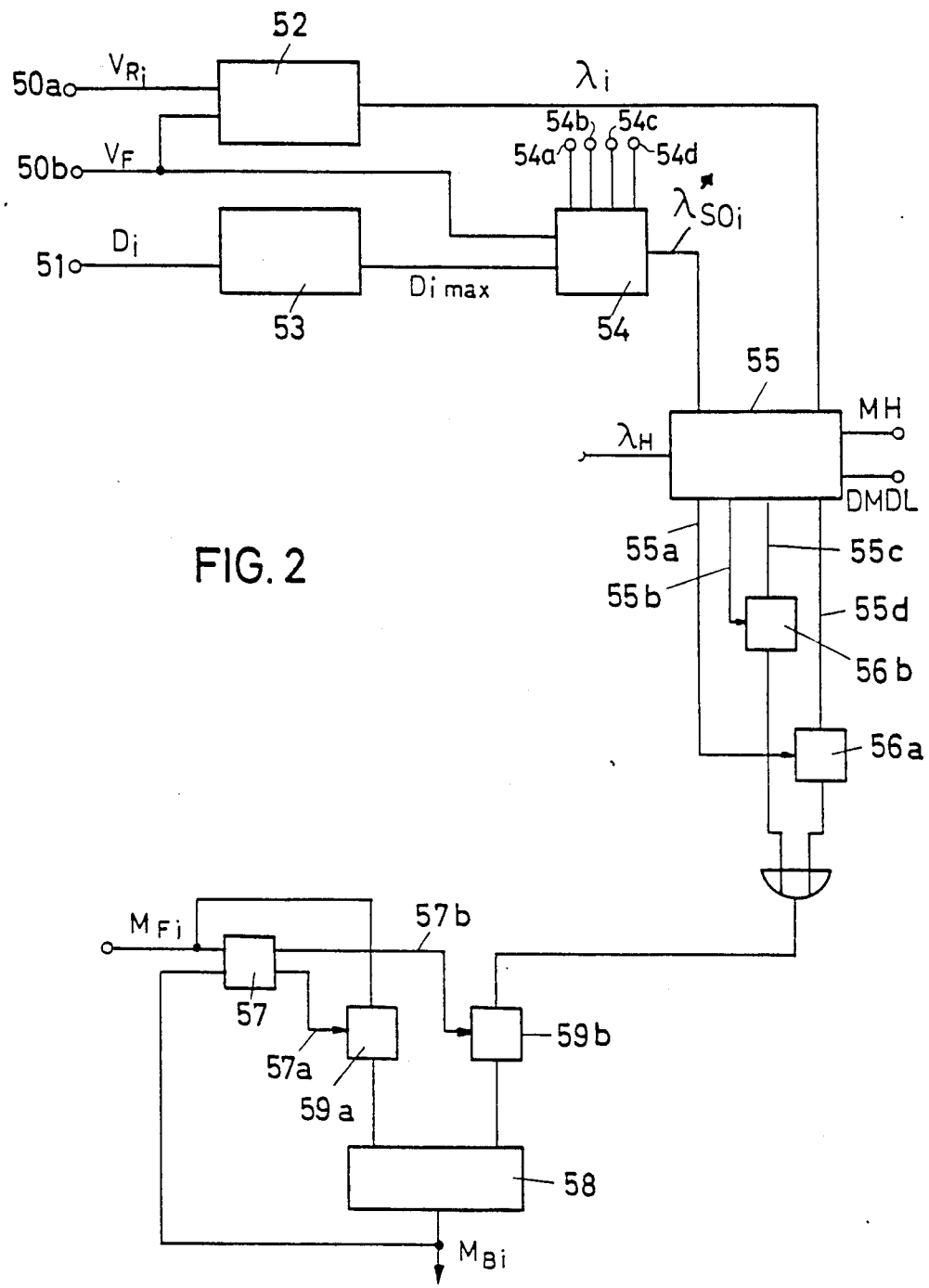
Figure 3:
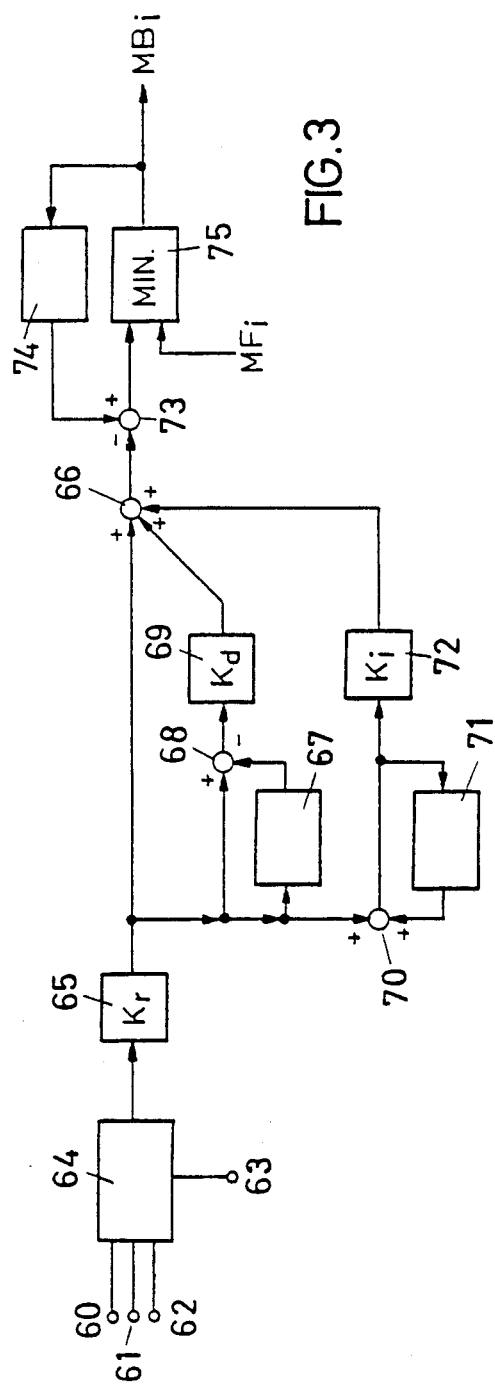
Figure 4:
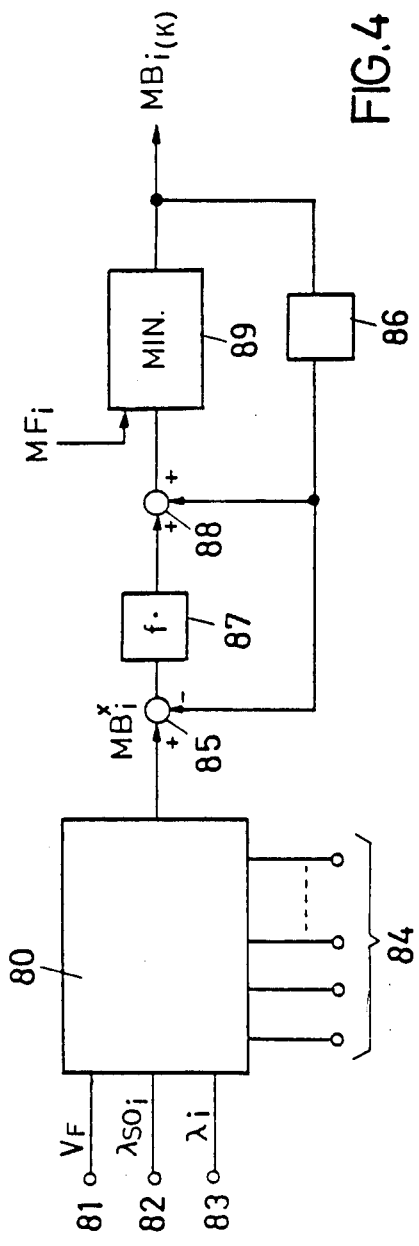

Exemplary embodiment of the invention will now be explained, referring to the drawings. Shown are:

FIG. 1, a block circuit diagram of an anti-skid regulating system embodied in accordance with the invention; and FIGS. 2–4, various embodiments of the regulator.

The slip regulator of FIG. 1 operates largely digitally. The regulator could also be designed for analog operation. Instead of the discrete structure shown here, a microcomputer can also be used.

The symbol k in the blocks is a time counter. After each cycle in the algorithm, the time counter is increased by 1. The block diagram is divided into two logic portions by a dashed horizontal line. Above the dashed line, the amplification matrix $K(k+1)$ of the Kalman filter is calculated. Below the dashed line, the required braking moment is ascertained. Connections drawn with single lines represent single connections, while those drawn in double lines represent multiple electrical connections.

At bottom left in FIG. 1, the sensors for the wheel speeds $1a/2d - 1d/2d$ and the sensor for the vehicle speed $2e$ are schematically shown. The sensor signals are amplified in an amplifier 3 and digitized in a converter 4. In a block 5, the digitized signals are linearized, so that the signals $z(k+1)$ at the output of block 5 are proportional to the wheel speeds or to the vehicle speed. In a subtracter 6, as shown in FIG. 1, the estimated signals $\hat{z}(k+1)$ at the output of a memory 27 are subtracted from these signals $z(k+1)$. The resultant difference, $\tilde{z}(k+1)$, represents an estimate of the measurement error and is multiplied in an amplifier 7 by the variable Kalman amplification matrix, $K(k+1)$. The amplified difference at the output is now added in an adder 8 to the predicted status vector $\hat{x}(k+1/k)$, which is stored in the memory 25. The sum is the newly filtered status vector, $\hat{x}(k+1/k+1)$, which includes both the wheel and vehicle speeds and the instantaneous braking forces.

The filtered status vector, $\hat{x}(k+1/k+1)$, is delivered to a regulator 9. In the regulator 9, the required values for the braking moments are ascertained by using a regulating algorithm for each wheel. These values are compared with the braking moments for the wheels, MFi, as dictated by the driver (the symbol i is the number of the wheel). Because of how the brakes are coordinated for braking at different axles, the driver generally dictates two braking moments. From the value calculated for the wheel and the dictated value MFi, the regulator selects the smaller value. This value is converted into analog signals for each wheel in a digital/analog converter 10 and delivered to a brake pressure regulator 11. At its output, there are signals for the braking pressures with which the individual wheels should be braked.

In FIG. 1, one possible regulating circuit for controlling the necessary braking pressure at one wheel brake 12 is shown. A pressure source is shown there at 13, a valve assembly at 14 and a pressure gauge at 15. The actual signal of the pressure gauge 15 is compared in a comparison element 16 with the set-point signal at the output of the brake pressure regulator. If the actual signal deviates in one direction or the other from the set-point signal, then the comparator, on one of its lines, emits a control signal for the valve 14, which is directed into a pressure reduction or pressure buildup position accordingly until such time as the actual pressure has been corrected.

The signals at the output of the regulator 9 are multiplied in a block 22 with the matrix $\Gamma_1$ and added at 24 as shown in FIG. 1 to the output of a block 23. The sum is a prediction of the status vector in the next calculation cycle, $\hat{x}(k+2/k+1)$. This status vector is stored for the next cycle in a memory 25. Also, the predicted status vector, $\hat{x}(k+2/k+1)$, is multiplied in a block 26 by a matrix H, so that the predicted measurement vector $\hat{z}(k+2)$ is present at the output of block 26. This predicted measurement vector is stored for the next cycle in the memory 27. At the output of a block 23, a vector is present which is the product of the transition matrix $\Phi$ and the newly filtered status vector $\hat{x}(k+1/k+1)$. Now the algorithm cycle symbol k is incremented by 1, and the calculations above the dashed line are performed.

For calculating the new Kalman amplification matrix, the transposed transition matrix $\Phi^T$ is multiplied (in 29) with the covariance matrix of the status vector P(k/k). The product is once again multiplied with the transition matrix $\Phi$, in a block 30, and the result is added in the adder 31 to the constant matrix $\Gamma_2 Q_2^T$ from block 32. The sum, which is a prediction of the new covariance matrix P(k+1/k), is stored in memories 33 and 45.

The transposed measured matrix $H^T$ stored in a block 34 is now multiplied, in a block 33, with the covariance matrix P(k+1/k) and the product is stored in a memory 40. The product is also multiplied in block 35 by the measurement matrix H yielding a result $E_1$. In a block 37, the status x(k/k) is multiplied by the matrix S, and the product, together with the constant matrix $R_o$ (from 38), is added in an adder 36 to the output of the block 35 yielding a result $E_2$. The sum is then inverted (block 39).

The inverted sum is then multiplied in a block 40 with the matrix P(k+1/K)H$^T$, and the product K(k+1), the Kalman amplification matrix, is stored in the memory 41. Block 37 is used in order to calculate the variation of the status disruptions as a function of the status.

The matrix K(k+1) is now used both for calculating the covariance matrix P(k/k) in the new calculation cycle and for estimating the status $\hat{x}(k+1/k+1)$. For calculating the new covariance matrix P(k/k), the measurement matrix H of block 42 is multiplied by K(k+1) in block 41. The product is subtracted in a subtracter 43 from the identity matrix I (44). The difference is stored in a memory 46. The prediction of the covariance matrix P(k+1/k) from the memory 45 is then multiplied in block 46 by the difference, and the result, the new covariance matrix P(k+1/k+1), is stored in the memory 29.

Three possibilities for the embodiment of the regulator 9 will be proposed below. For each wheel i, each regulator forms the difference between the instaneous tire slip $\lambda_i$ and the optimal tire slip $\lambda_{soi}$. As already mentioned in the introduction above, the optimal slip is dependent on the road characteristics (coefficient of friction) and the vehicle speed, among other factors. Only these two influential factors are taken into consideration, although naturally other factors, such as oblique travel, could in principle be considered as well.

At the input of the regulator 9, the filtered status, $\hat{x}(k+1/k+1)$, is present. To simplify the notation, the circumflex symbol ( ) is omitted from the variables, although naturally the filtered variables are meant: for instance, $\hat{V}F$ as written stands for VF.

The tire slip $\lambda i$ for the wheel i is generally defined as $$\lambda i = \frac{VF - VRi}{VF}$$

where
VF = vehicle speed
VRi = circumferential speed of wheel $i = _i \cdot R_i$
$\omega_i$ = rotary speed of wheel i
Ri = dynamic tire radius of wheel i.

The optimal slip, $\lambda_{soi}$, is calculated by the following formula, for example:

$$\lambda_{soi} = \frac{1 + B1 \cdot \lambda_{oi} \cdot VF}{1 + B1 \cdot VF}$$

where
VF = vehicle speed
B1 = contant (e.g., 1.0)

$$\lambda_{oi} = A1 + \frac{A2 \cdot D_{imax}}{FZi}$$

A1 = constant (e.g., 0.03)
A2 = constant (e.g., 0.22)
Di$_{max}$ = maximum braking force of wheel i
FZi = tire/road contact force of wheel i.

The set-point slip $\lambda^x_{soi}$ may be the slip of the maximum of the $\mu$ slip curve. However, as a rule it is smaller, in a predetermined manner, than the slip $\lambda_{soi}$ of the maximum.

The maximum braking force are calculated from the instantaneous braking forces. The optimal slip is not calculated until the braking forces desired by the driver are greater than those that the road surface can accept. If the braking forces remain smaller than this during braking, then the braking moment desired by the driver is not corrected. Only if the transmissible braking force is exceeded is a braking correction effected by the regulator. In the description of the regulator, it is presumed that the optimal slip has already been exceeded once.

In the exemplary embodiment according to FIG. 2 for the regulator 9, the correction $\Delta M_i$ of the instantaneous braking moment MBi for the wheel i is fixed as follows:

$$\Delta Mi = 0, \text{ if } /\lambda_i - \lambda^x_{soi}/ \text{ for } \lambda i < \lambda_H; \text{ otherwise,} \quad \text{(I)}$$

$$\Delta Mi = MH + [\lambda_i - (\lambda^x_{soi} + \lambda_H)] \cdot DMDL, \text{ if } \lambda_i > \lambda^x_{soi} + \lambda_H \quad \text{(II)}$$

$$\Delta Mi = -MH + [\lambda_i - (\lambda^x_{soi} - \lambda_H)] \cdot DMDL, \text{ if } \lambda_i < \lambda^x_{soi} - \lambda_H \quad \text{(III)}$$

where
$\lambda_i$ = tire slip of wheel i
$\lambda_H$ = holding slip (e.g., 0.015)

MH=jump in braking moment following holding phase (e.g., 100 Nm)

DMDL=slope of braking moment over slip (e.g., 1500 Nm).

This correction is subtracted from the instantaneous braking moment MBi and the result is the new braking moment $MBi^x$:

$$MBi^x = MBi - \Delta Mi.$$

However, this braking moment must not exceed the braking moment directed by the driver, which is MFi for the wheel i. Accordingly, the following equations apply:

$$MBi = MBi^x \text{ as long as } MBi^x < MFi;$$

$$MBi = MFi \text{ if } MBi^x > MFi$$

The holding slip $\lambda_H$ effects a regulator hysteresis in order to smooth out regulator activity.

In FIG. 2, an exemplary embodiment for a regulator of this kind is shown, but only for one wheel i.

At the terminals 50a, 50b and 51, the regulator is supplied with the vehicle speed VF, the corresponding wheel speed $V_{Ri}$ and the instantaneous braking force Di of the wheel.

In a block 52, the slip $\lambda_i$ of this wheel is ascertained, and in block 53, from the braking force Di, the maximal braking force $Di_{max}$ is ascertained by forming a maximum when the maximum of the $\mu$ slip curve is exceeded. From this and from the constants $B_1$, $A_1$, $A_2$ and the variable tire/rod contact force FZi of the wheel that are fed to the terminals 54a–54d, the set-point slip $\lambda^x_{soi}$ is ascertained in block 54. From the instantaneous set-point slip $\lambda^x_{soi}$ of the wheel, the actual slip $\lambda_i$, the predetermined holding slip $\lambda_H$ and the constants DMDL and MH, the corrections $\Delta M_i$ are now ascertained in block 55 in accordance with the equations given above in II and III, and furthermore it is determined which of the inequalities in II or III is satisfied. If the inequality in II is satisfied, a signal appears on a line 55a, which makes a gate 56a passable for the $\Delta M_i$ value according to equation II. In the event that the inequality in III is satisfied, then by means of a signal on the line 55b, a gate 56b is made passable for the $\Delta M_i$ value according to equation III.

In a comparator 57, the braking moment MBi emitted by block 58 is compared with the braking moment dictated by the driver. If the braking moment dictated by the driver $MF_i$, is smaller than the instantaneous braking moment $MB_i$, then via the line 57a a gate 59a is opened; thus the braking moment $MF_i$ dictated by the driver determines the instantaneous braking moment.

On the other hand, the comparator 57 emits a signal to line 57b and makes a gate 59b passable for the $\Delta M_i$ value, if the instantaneous braking moment MBi is smaller than the braking moment MFi specified by the driver. Thus the instantaneous braking moment MBi is corrected in one or the other direction by the amount $\Delta Mi$.

In the alternative shown in FIG. 3 for the regulator 9, the regulated variable is a somewhat differently defined deviation from the set-point value and is defined as follows:

$$\delta_i^x = \frac{VF - \lambda^x_{soi} \cdot VF - VRi}{VF + a}$$

where
 VF=vehicle speed
 $\lambda^x_{soi}$=set-point tire slip for wheel i
 VRi=circumferential speed of wheel i and
 a=constant (e.g., 0.1).

The purpose of the constant a is to prevent the nominator's becoming zero if VF is zero.

The brake correction here is as follows:

$$\Delta Mi(k+1) = \quad \text{(IV)}$$

$$Kr \cdot \left[ \delta^x_i(k+1) + Kd(\delta^x_i(k+1) - \delta^x_i(k)) + ki \cdot \sum_{j=0}^{K-1} \delta^x_i(j) \right]$$

where Kr, Kd, and Ki are constant.

The first term on the right-hand side of this equation is the proportional part, while the second term is the differential part and the third term is the integral part. As in the regulator of FIG. 2, this correction is subtracted from the instantaneous braking moment MBi, as follows:

$$MBi = MBi - \Delta Mi(k+1).$$

Here again, as in the case of the regulator of FIG. 2, $MBi^x$ cannot become larger than the braking moment MFi for the wheel i dictated by the driver.

A block circuit diagram of the PID regulator is shown in FIG. 3. From the variables VF, $\lambda^x_{soi}$ and VRi delivered via lines 60–62 and from the constant a/x delivered via a terminal 63, $\delta HU \ x_i$ is formed in a block 64 and multiplied in a block 65 by the constant Kr. In an adder 66, the sum is formed in accordance with equation IV, and by means of a branch having a memory 67, a subtracter 68 and a multiplier 69, the second term in square brackets in equation IV is formed, and in the branch having a summing element 70, a memory 71 and a multiplier 72, the last term in equation IV is formed. The summing signal $\Delta Mi(k+1)$ is subtracted by means of a subtracter 73 from the braking moment MBi (in the memory 74) ascertained in the previous cycle, and the result obtained is the new braking moment $M_{Bi}^x$.

A block 75 which selects the minimum between $M_{Bi}^x$ and MFi now determines the new braking moment $MBi^x$.

In a further regulator, the required braking moment is calculated, with the intermediate formula:

$$MBi^x = \frac{\left( Di \cdot Ci \frac{KAFi}{VF} - Di_{soll} \right) \cdot Ri}{Ci \frac{KAFi}{VF} - 1} \quad \text{if } \lambda_i > 0 \quad \text{(V)}$$

where $$KAFi = \frac{-Di}{\lambda^x_{soi} + \delta_i} \text{ for } \lambda_i < \lambda_{soi} \quad \text{(VI)}$$

or $$KAFi = \frac{-Di}{\delta_{imax} - \delta_i} \text{ for } \lambda_i > \lambda_{soi}$$

-continued $$Di_{soll} = \frac{Di \cdot \lambda_{soi}^x}{\lambda_{soi}^x + \delta_i} \text{ for } \lambda i < \lambda_{soi}$$

or $$Di_{soll} = \frac{Di \cdot \delta_{imax}}{\delta_{imax} - \delta_i} \text{ for } \lambda_i > \lambda_{soi}$$

and

Ri = tire radius
Ci = constant
VF = vehicle speed
$\delta_{imax}$ = constant (e.g., 5)
$\delta_i = \lambda_i - \lambda HU\ x_{soi}$.

Approximately this braking moment would be necessary in order to bring the wheel slip to the optimal value in an algorithm calculation cycle.

If the tire slip is zero, that is, if $\lambda_i = 0$, then $$MBi^x = MFi,$$

where MFi is the braking moment of the wheel i as dictated by the driver.

Because the calculated braking moment is approximate in nature, preferably the entire moment is not exerted, but only a portion of it.

$$MBi(k+1) = MBi(k) + f \cdot (MBi^x - MBi(k)) \text{ for }$$
$$MBi(k+1) < MFi;$$

otherwise, $$MBi(k+1) = MFi,$$

where f is a constant (e.g., 0.5).

In FIG. 4, a computer 80 is provided, which ascertains the set-point braking moment $MBi^x$ in accordance with equation V, taking the relationships in VI into account, and using the vehicle speed $V_f$, the optimal slip and the actual slip (terminals 81–83) and the further variables supplied to the terminals 84. From this set-point braking moment $MBi^x$, in a subtracter 85 the braking moment MBi(k) of the previous cycle, which has been stored in a memory 86, is subtracted; the difference is then multiplied (in 87) by f and the product is added (in 88) to the stored value MBi(k). Here again, a block 89 selects the smaller of the values, Mfi or MBi(k+1), as the new braking moment.

APPENDIX I

Definition of the symbols $x_1 = VF$ = vehicle speed
$x_2 = \omega_1$ = rotary speed of wheel 1

APPENDIX I-continued

Definition of the symbols $x_3 = \omega_2$ = rotary speed of wheel 2
$x_4 = \omega_3$ = rotary speed of wheel 3
$x_5 = \omega_4$ = rotary speed of wheel 4
$x_6 = D_1$ = braking force of tire 1
$x_7 = D_2$ = braking force of tire 2
$x_8 = D_3$ = braking force of tire 3
$x_9 = D_4$ = braking force of tire 4
m = vehicle mass
$I_1$ = moment of inertia of wheel 1 about its axis of rotation
$I_2$ = moment of inertia of wheel 2 about its axis of rotation
$I_3$ = moment of inertia of wheel 3 about its axis of rotation
$I_4$ = moment of inertia of wheel 4 about its axis of rotation
$R_1$ = dynamic tire radius of wheel 1
$R_2$ = dynamic tire radius of wheel 2
$R_3$ = dynamic tire radius of wheel 3
$R_4$ = dynamic tire radius of wheel 4
$MB_1$ = braking moment on wheel 1
$MB_2$ = braking moment on wheel 2
$MB_3$ = braking moment on wheel 3
$MB_4$ = braking moment on wheel 4
$M_B$ = braking moment vector
n = noise level in the braking forces
$b_1$ = noise amplification in $x_6$
$b_2$ = noise amplification in $x_7$
$b_3$ = noise amplification in $x_8$
$b_4$ = noise amplification in $s_9$
A = system matrix
$B_1$ = regulating matrix
$B_2$ = disruption or interference matrix
H = measurement matrix
$z_1 = VF_s$ = measured value of vehicle speed
$z_2 = \omega_{1s}$ = measured value of rotary speed of wheel 1
$z_3 = \omega_{2s}$ = measured value of rotary speed of wheel 2
$z_3 = \omega_{3s}$ = measured value of rotary speed of wheel 3
$z_4 = \omega_{4s}$ = measured value of rotary speed of wheel 4
r = noise level of the measurements
$r_1$ = noise amplification in $z_1$
$r_2$ = noise amplification in $z_2$
$r_3$ = noise amplification in $z_3$
$r_4$ = noise amplification in $z_4$
$r_5$ = noise amplification in $z_5$
R = amplification matrix of status noise
$\Phi$ = transition matrix
$\Gamma_1$ = regulating transition matrix
$\Gamma_2$ = disruption transition matrix
k = time index; increased by 1 in the calculation algorithm after each cycle
P(k/k) = covariance matrix of the status
P(k + 1/k) = prediction of status covariance matrix
$P_j$ = constant
T = cycle time of calculation algorithm
S = amplification matrix of measurement error with status
$R_o$ = constant portion of status distortion matrix
K(k + 1) = Kalman amplification matrix
$Q_{(k)}$ = covariance matrix of the distortions in the braking forces
q = constant
$n_t$ = white noise

APPENDIX II
System Equation and Definitions of Matrixes

System Equation

$\dot{x}_1 = -(x_6 + x_7 + x_8 + x_9)/m$
$\dot{x}_2 = (x_6 \cdot R_1 - M_{B1})/I_1$
$\dot{x}_3 = (x_7 \cdot R_2 - M_{B2})/I_2$
$\dot{x}_4 = (x_7 \cdot R_3 - M_{B3})/I_3$
$\dot{x}_5 = (x_8 \cdot R_4 - M_{B4})/I_4$
$\dot{x}_6 = b_1 \cdot n_1$
$\dot{x}_7 = b_2 \cdot n_1$
$\dot{x}_8 = b_3 \cdot n_1$
$\dot{x}_9 = b_4 \cdot n_1$

System Equation as Vector Equation

$\dot{x} = Ax + B_1 \cdot M_B + B_2 \cdot n$ $$A = \begin{vmatrix} 0 & 0 & 0 & 0 & 0 & \frac{-1}{m} & \frac{-1}{m} & \frac{-1}{m} & \frac{-1}{m} \\ 0 & 0 & 0 & 0 & 0 & \frac{R_1}{I_1} & 0 & 0 & 0 \\ 0 & 0 & 0 & 0 & 0 & 0 & \frac{R_2}{I_2} & 0 & 0 \\ 0 & 0 & 0 & 0 & 0 & 0 & 0 & \frac{R_3}{I_3} & 0 \\ 0 & 0 & 0 & 0 & 0 & 0 & 0 & 0 & \frac{R_4}{I_4} \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{vmatrix}$$

$$B_1 = \begin{vmatrix} 0 & 0 & 0 & 0 \\ \frac{-1}{I_1} & 0 & 0 & 0 \\ 0 & \frac{-1}{I_2} & 0 & 0 \\ 0 & 0 & \frac{-1}{I_3} & 0 \\ 0 & 0 & 0 & \frac{-1}{I_4} \\ 0 & 0 & 0 & 0 \\ 0 & 0 & 0 & 0 \\ 0 & 0 & 0 & 0 \\ 0 & 0 & 0 & 0 \end{vmatrix} \quad B_2 = \begin{vmatrix} 0 \\ 0 \\ 0 \\ 0 \\ 0 \\ b_1 \\ b_2 \\ b_3 \\ b_4 \end{vmatrix} \quad M_B = \begin{vmatrix} M_{B1} \\ M_{B2} \\ M_{B3} \\ M_{B4} \end{vmatrix} \quad n = \begin{vmatrix} n_1 \\ n_1 \\ n_1 \\ n_1 \end{vmatrix}$$

Measurement Equation

$z_1 = x_1 + \nu_1 \cdot \nu_2$
$z_2 = x_2 + \nu_2 \cdot \nu_2$
$z_3 = x_3 + \nu_3 \cdot \nu_2$
$z_4 = x_4 + \nu_4 \cdot \nu_2$
$z_5 = x_5 + \nu_5 \cdot \nu_2$

Measurement Equation in Vector Form

$z = H \cdot x + R \cdot \nu$ $$H = \begin{vmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \end{vmatrix} \quad \nu = \begin{vmatrix} \nu_1 \\ \nu_1 \\ \nu_1 \\ \nu_1 \\ \nu_1 \end{vmatrix}$$

$$R = \begin{vmatrix} r_{o1} & 0 & 0 & 0 & 0 \\ 0 & r_{o2} & 0 & 0 & 0 \\ 0 & 0 & r_{o3} & 0 & 0 \\ 0 & 0 & 0 & r_{o4} & 0 \\ 0 & 0 & 0 & 0 & r_{o5} \end{vmatrix}$$

$r_i = r_{oi} + x_i \cdot s_i \quad i = 1, \ldots, 5$ $$\Gamma_2 = \begin{vmatrix} \frac{-b_1 \cdot T^2}{2m} & \frac{-b_2 \cdot T^2}{2m} & \frac{-b_3 \cdot T^2}{2m} & \frac{-b_4 \cdot T^2}{2m} \\ \frac{b_1 \cdot R_1 \cdot T^2}{2I_1} & 0 & 0 & 0 \\ 0 & \frac{b_2 \cdot R_2 \cdot T^2}{2I_2} & 0 & 0 \\ 0 & 0 & \frac{b_3 \cdot R_3 \cdot T^2}{2I_3} & 0 \\ 0 & 0 & 0 & \frac{b_4 \cdot R_4 \cdot T^2}{2I_4} \\ b_1 \cdot T & 0 & 0 & 0 \\ 0 & b_2 \cdot T & 0 & 0 \\ 0 & 0 & b_3 \cdot T & 0 \\ 0 & 0 & 0 & b_4 \cdot T \end{vmatrix}$$

$$\phi = \begin{vmatrix} 1 & 0 & 0 & 0 & 0 & \frac{-T}{m} & \frac{-T}{m} & \frac{-T}{m} & \frac{-T}{m} \\ 0 & 1 & 0 & 0 & 0 & \frac{T \cdot R_1}{I_1} & 0 & 0 & 0 \\ 0 & 0 & 1 & 0 & 0 & 0 & \frac{T \cdot R_2}{I_2} & 0 & 0 \\ 0 & 0 & 0 & 1 & 0 & 0 & 0 & \frac{T \cdot R_3}{I_3} & 0 \\ 0 & 0 & 0 & 0 & 1 & 0 & 0 & 0 & \frac{T \cdot R_4}{I_4} \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{vmatrix}$$

$$\Gamma_1 = \begin{vmatrix} 0 & 0 & 0 & 0 \\ \frac{-T}{I_1} & 0 & 0 & 0 \\ 0 & \frac{-T}{I_2} & 0 & 0 \\ 0 & 0 & \frac{-T}{I_3} & 0 \\ 0 & 0 & 0 & \frac{-T}{I_4} \\ 0 & 0 & 0 & 0 \\ 0 & 0 & 0 & 0 \\ 0 & 0 & 0 & 0 \\ 0 & 0 & 0 & 0 \end{vmatrix}$$

$$P(o/o) = \begin{vmatrix} P1 & 0 & 0 & 0 & 0 & 0 & 0 & 0 & 0 \\ 0 & P2 & 0 & 0 & 0 & 0 & 0 & 0 & 0 \\ 0 & 0 & P3 & 0 & 0 & 0 & 0 & 0 & 0 \\ 0 & 0 & 0 & P4 & 0 & 0 & 0 & 0 & 0 \\ 0 & 0 & 0 & 0 & P5 & 0 & 0 & 0 & 0 \\ 0 & 0 & 0 & 0 & 0 & P6 & 0 & 0 & 0 \\ 0 & 0 & 0 & 0 & 0 & 0 & P7 & 0 & 0 \\ 0 & 0 & 0 & 0 & 0 & 0 & 0 & P8 & 0 \\ 0 & 0 & 0 & 0 & 0 & 0 & 0 & 0 & P9 \end{vmatrix}$$

$$Q = q \cdot \begin{vmatrix} 1 & 0 & 0 & 0 \\ 0 & 1 & 0 & 0 \\ 0 & 0 & 1 & 0 \\ 0 & 0 & 0 & 1 \end{vmatrix}$$

$$R_o = \begin{vmatrix} r_{o1} & 0 & 0 & 0 & 0 \\ 0 & r_{o2} & 0 & 0 & 0 \\ 0 & 0 & r_{o3} & 0 & 0 \\ 0 & 0 & 0 & r_{o4} & 0 \\ 0 & 0 & 0 & 0 & r_{o5} \end{vmatrix}$$

$$S = \begin{vmatrix} S_1 & 0 & 0 & 0 & 0 \\ 0 & S_2 & 0 & 0 & 0 \\ 0 & 0 & S_3 & 0 & 0 \\ 0 & 0 & 0 & S_4 & 0 \\ 0 & 0 & 0 & 0 & S_5 \end{vmatrix}$$

APPENDIX II -continued
System Equation and Definitions of Matrixes $$q \cdot \begin{bmatrix} (b_1^2+b_2^2+b_3^2+b_4^2)\cdot\frac{T^4}{4m^2} & \frac{-b_1^2\cdot R_1\cdot T^4}{4\cdot m\cdot I_1}+\frac{b_1^2\cdot R_1^2\cdot T^4}{4\cdot I_1^2} & \frac{-b_2^2\cdot R_2\cdot T^4}{4\cdot m\cdot I_2}+\frac{b_2^2\cdot R_2^2\cdot T^4}{4\cdot I_2^2} & \frac{-b_3^2\cdot R_3\cdot T^4}{4\cdot m\cdot I_3}+\frac{b_3^2\cdot R_3^2\cdot T^4}{4\cdot I_3^2} & \frac{-b_4^2\cdot R_4\cdot T^4}{4\cdot m\cdot I_4}+\frac{b_4^2\cdot R_4^2\cdot T^4}{4\cdot I_4^2} & \frac{-b_1^2\cdot T^3}{2\cdot m}+\frac{b_1\cdot R_1\cdot T^3}{2\cdot I_1} & \frac{-b_2^3\cdot T^3}{2\cdot m}+\frac{b_2^2\cdot R_2\cdot T^3}{2\cdot I_2} & \frac{-b_3^2\cdot T^3}{2\cdot m}+\frac{b_3^2\cdot R_3\cdot T^3}{2\cdot I_3} & \frac{-b_4^2\cdot T^3}{2\cdot m}+\frac{b_4^2\cdot R_4\cdot T^3}{2\cdot I_4} \\ \frac{-b_1^2\cdot R_1\cdot T^4}{4\cdot m\cdot I_2} & 0 & 0 & 0 & 0 & 0 & 0 & 0 & 0 \\ \frac{-b_2^2\cdot R_2\cdot T^4}{4\cdot m\cdot I_2} & 0 & \frac{b_2^2\cdot R_2^2\cdot T^4}{4\cdot I_2^2} & 0 & 0 & 0 & 0 & 0 & 0 \\ \frac{-b_3^2\cdot R_3\cdot T^4}{4\cdot m\cdot I_3} & 0 & 0 & \frac{b_3^2\cdot R_3^2\cdot T^4}{4\cdot I_3^2} & 0 & 0 & 0 & 0 & 0 \\ \frac{-b_4^2\cdot R_4\cdot T^4}{4\cdot m\cdot I_4} & 0 & 0 & 0 & \frac{b_4^2\cdot R_4^2\cdot T^4}{4\cdot I_4^2} & 0 & 0 & 0 & 0 \\ \frac{-b_1^2\cdot T^3}{2\cdot m} & \frac{b_1^2\cdot R_1\cdot T^3}{2\cdot I_1} & 0 & 0 & 0 & b_1^2\cdot T^2 & 0 & 0 & 0 \\ \frac{-b_2^2\cdot T^3}{2\cdot m} & 0 & \frac{b_2^2\cdot R_2\cdot T^3}{2\cdot I_2} & 0 & \frac{b_4^2\cdot R_4\cdot T^3}{2\cdot I_4} & 0 & b_2^2\cdot T^2 & 0 & 0 \\ \frac{-b_3^2\cdot T^3}{2\cdot m} & 0 & 0 & \frac{b_3^2\cdot R_3\cdot T^3}{2\cdot I_3} & 0 & 0 & 0 & b_3^2\cdot T^2 & 0 \\ \frac{-b_4^2\cdot T^3}{2\cdot m} & 0 & 0 & 0 & 0 & 0 & 0 & 0 & b_4^2\cdot T^2 \end{bmatrix}$$

$$I = \begin{vmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{vmatrix}$$

We claim:

1. A method for ascertaining a set-point braking moment for various wheels of a vehicle, using input variables $Z(K+1)i$, which are dependent on wheel speeds $V_R$ of these wheels and on a vehicle speed $V_F$ wherein i is $2-n$ for the variable dependent on the wheel speeds and $Z(K+1)_1$ for the variable dependent on the vehicle speed, characterized in that a Kalman filter is used in such a manner comprising the steps of
   (a) forming at predetermined time intervals T, a difference between input signals $Z(K+1)_i$ and simulation values $\hat{Z}(K+1)_i$ ascertained in the Kalman filter based on previous measurements;
   (b) converting these differences $\tilde{Z}(K+1)_i$, by multiplication with a Kalman amplification factor K that forms a matrix, into $2n+1$ difference values $\tilde{X}(k+1/k+1)_i$;
   (c) forming respective sums of these difference values $\tilde{X}(K+1/K+1)_i$ and corresponding simulation values $\hat{X}(k+1/K)_i$;
   (d) delivering these summed values $\hat{X}(K+1/K+1)_i$ to a regulator, which compares the summed values corresponding to the wheel speeds and the vehicle speed to ascertain signals $MB_i$ corresponding to braking moments for the wheel brakes;
   (e) storing in a memory the summed values, after multiplication by a transition matrix $\phi$ and after addition to the signals $MB_i$ multiplied by a matrix $\Gamma_1$, as simulation values $\hat{X}(k+2/k+1)$ for the next sum formation;
   (f) and storing the simulation values $\hat{X}(k+2/k+1)$, after multiplication by a measurement matrix H, in a second memory as a simulation value $\hat{Z}(k+2)$ for the next measurement,
   wherein the terms $(k+m,$ and $k+m/k+n)$ are corresponding variables used in the evaluation of different cycles wherein m and n denote the cycle number, and wherein T is the cycle time.

2. A method as defined by claim 1, which comprises a step of ascertaining the Kalman amplification factor matrix $K(k+m)$ in each case after the following method progression comprising the steps of:
   (a) multiplying a transposed transition matrix $\phi_T$ by a covariance matrix $P(k/k)$ ascertained in the previous cycle, and multiplying this product by a transition matrix $\phi$;
   (b) adding this product to a constant matrix $\Gamma_2 \cdot Q \cdot \Gamma_2^T$, so as to obtain a prediction for a new covariance matrix $P(k+1/k)$;
   (c) multiplying this prediction by a transposed measurement matrix $H^T$, storing the result, $P(k+1/k) \cdot H^T$, in memory and multiplying this product by the measurement matrix H, yielding a result $E_1$;
   (d) multiplying the input values of the regulator by a matrix S and adding this product to a constant matrix $R_o$ and to the result $E_1$, producing the result $E_2$;
   (e) inverting this result $E_2(1/E_2)$, and multiplying the stored result $P(k+1/k) \cdot H^T$ thereby, resulting in the Kalman amplification matrix $K(k+1)$;
   (f) multiplying this matrix by the measurement matrix H and subtracting the result from an identity matrix I;
   (g) multiplying this difference, $I - K(k+1) \cdot H$, by the already ascertained prediction for the new covariance matrix $P(k+1/k+1)$, resulting in a new covariance matrix $P(k+1/k+1)$ for calculating a Kalman amplification matrix $K(k+2)$ for the next cycle.

3. A method as defined by claim 1, characterized in that in the regulator, after a definition of a formula $$\lambda_{soi} = \frac{1 + B1 \cdot \lambda_{oi} \cdot VF}{1 + B1 \cdot VF}$$

comprises the steps of ascertaining a signal $\lambda_{soi}$ that corresponds to an instantaneously optimal slip for each wheel i, and that with this optimal slip signal $\lambda_{soi}$ and an instantaneous slip signal $\lambda i$ of each wheel, ascertaining the braking moment signal $MB_i$ for each wheel, and in order to influence the brake using the braking moment to adapt the wheel slip $\lambda i$ to a set-point slip value $\lambda^x_{soi} \leq \lambda_{soi}$, wherein the variables in the formula have the following meanings:

$$\lambda i = \frac{VF - VRi}{VF}$$

VF = vehicle speed signal = $(\hat{x}(k/k))$
VRi = circumferential speed of the wheel
$B_1$ = a constant (e.g., 1.0)

$$\lambda_{oi} = A1 + \frac{A2 \cdot D_{imax}}{FZi}$$

A1 = constant (e.g., 0.03)
A2 = constant (e.g., 0.22)
$D_{imax}$ = maximum braking force of the wheel
FZi = tire/road contact force of wheel 1
$R_i$ = the dynamic tire radius.

4. A method as defined by claim 3, comprising the steps of ascertaining a correction $\Delta Mi$ for an instantaneous braking moment $MB_i$ based on equations $$\Delta Mi = MH + (\lambda i - \lambda^x_{soi}) \cdot DMDL \text{ for } \lambda i > \lambda^x_{soi} \quad (A)$$

or $$\Delta M = MH + (\lambda i - \lambda^x_{soi}) \cdot DMDL \text{ for } \lambda i < \lambda^x_{soi} \quad (B)$$

and from this, based on an equation $$MB_i^x = MB_i - \Delta Mi$$

ascertaining a new braking moment $MB_i^x$, this being made operative only if $MB_i^x$ is smaller than the braking moment directed by a driver, wherein MH is a small constant braking moment and DMDL is a predetermined slope of the braking moment over the slip.

5. A method as defined by claim 4, which comprises replacing $\lambda^x_{soi}$ in the equations and inequalities A and B by $\lambda^x_{soi} + \lambda_H$ in A $\lambda^x_{soi} - \lambda_H$ in B $\lambda_H$ is a small constant slip value.

6. A method as defined by claim 3, which comprises the steps of ascertaining a deviation $\delta_i^x$ of the actual slip from the set-point slip $\lambda^x_{soi}$ according to the equation $$\delta_i^x = \frac{VF - \lambda^x_{soi} \cdot V_F - VRi}{VF + a}$$

and ascertaining the braking moment correction Mi (k+1) in accordance with the equation $$\Delta Mi(k + 1) = Kr \cdot \left[ \delta i^x(k + 1) + Kd \cdot (\delta i^x(k + 1) - \delta i^x(k)) + Ki \cdot \sum_{j=0}^{K-1} \delta i^x(j) \right]$$

where Kr, Kd and Ki are constants.

7. A method as defined by claim 6, characterized in that the new braking moment is either the braking moment MFi directed by the driver or—if it is smaller—the braking moment $$MB_i^x = MBi - \Delta Mi(k+1)$$

where MBi is the previously ascertained braking moment.

8. A method as defined by claim 3, characterized in that the new braking moment $MB_i^*$ is determined in accordance with the equation $$MB_i^* = \frac{\left( Di \cdot Ci \frac{KAFi}{VF} - Di_{soll} \right) \cdot Ri}{Ci \frac{KAFi}{VF} - 1}, \text{ if } \lambda_i > 0$$

wherein the following conditions apply:

$$KAFi = \frac{-Di}{\lambda_{soi}^x + \delta_i} \text{ for } \lambda i < \lambda_{soi},$$

or $$KAFi = \frac{-Di}{\delta_{imax} - \delta_i} \text{ for } \lambda i > \lambda_{soi}$$

$$Di_{soll} = \frac{Di \cdot \lambda_{soi}^x}{\lambda_{soi}^x + \delta_i} \text{ for } \lambda i < \lambda_{soi},$$

or $$Di_{soll} = \frac{Di \cdot \delta_{imax}}{\delta_{imax} - \delta_i} \text{ for } \lambda_i > \lambda_{soi}$$

where
Ri=tire radius
Ci=constant
VF=vehicle speed
$\delta_{imax}$=constant (e.g., 5)
$\delta i = \lambda_i - \lambda^x_{soi}$.

9. A method as defined by claim 8, characterized in that only an attenuated adaptation of the braking moment to the ascertained value MBi* takes place.

10. A method as defined by claim 2, characterized in that in a regulator, after a definition of a formula $$\lambda_{soi} = \frac{1 + B1 \cdot \lambda_{oi} \cdot VF}{1 + B1 \cdot VF}$$

comprises the steps of ascertaining a signal $\lambda_{soi}$ that corresponds to an instantaneously optimal slip for each wheel i, and that with optimal slip signal $\lambda_{soi}$ and an instantaneous slip signal $\lambda i$ of the each wheel, ascertaining the braking moment signal MBi for each wheel, and in order to influence the brake using the braking moment to adapt the wheel slip $\lambda i$ to a set-point slip value $\lambda^x_{soi} \leq \lambda_{soi}$, wherein the variables in the formula have the following meanings:

$$\lambda i = \frac{VF - VRi}{VF}$$

VF=vehicle speed signal=$(\hat{x}(k/k))$
$VR_i$=circumferential speed of the wheel
$B_1$=a constant (e.g., 1.0)

$$\lambda_{oi} = A1 + \frac{A2 \cdot D_{imax}}{FZi}$$

A1=constant (e.g., 0.03)
A2=constant (e.g., 0.22)
$Di_{max}$=maximum braking force of the wheel
FZi=tire/road contact force of wheel 1
$R_i$=the dynamic tire radius.

* * * * *